United States Patent
Ohtomo et al.

(10) Patent No.: US 6,679,609 B2
(45) Date of Patent: Jan. 20, 2004

(54) LASER BEAM IRRADIATION DEVICE

(75) Inventors: Fumio Ohtomo, Tokyo-to (JP); Jun-ichi Kodaira, Tokyo-to (JP)

(73) Assignee: Kabushiki Kaisha Topcon, Tokyo-to (JP)

( * ) Notice: Subject to any disclaimer, the term of this patent is extended or adjusted under 35 U.S.C. 154(b) by 0 days.

(21) Appl. No.: 10/097,414

(22) Filed: Mar. 13, 2002

(65) Prior Publication Data
US 2002/0138996 A1 Oct. 3, 2002

(30) Foreign Application Priority Data
Mar. 28, 2001 (JP) ........................................ 2001-094004

(51) Int. Cl.[7] .............................................. G01C 15/00
(52) U.S. Cl. ................................ 359/615; 33/DIG. 21; 33/227; 33/228; 33/451; 33/285; 33/286; 356/494; 359/641; 359/874; 359/599
(58) Field of Search ..................... 33/286, DIG. 21, 33/227, 228, 451, 285; 356/494; 362/259; 359/874, 599, 615, 641

(56) References Cited

U.S. PATENT DOCUMENTS

| | | | | |
|---|---|---|---|---|
| 5,078,711 A | * | 1/1992 | Kakami et al. | 606/16 |
| 5,207,003 A | * | 5/1993 | Yamada et al. | 33/286 |
| 5,838,431 A | * | 11/1998 | Hara et al. | 33/DIG. 21 |
| 6,139,156 A | * | 10/2000 | Okamori et al. | 353/98 |
| 6,314,651 B1 | * | 11/2001 | Ohtomo et al. | 33/285 |
| 6,399,940 B1 | * | 6/2002 | Cui et al. | 356/494 |
| 2002/0051471 A1 | * | 5/2002 | Tamaki | |
| 2002/0138997 A1 | * | 10/2002 | Ohtomo et al. | |
| 2003/0009891 A1 | * | 1/2003 | Ohtomo et al. | |

FOREIGN PATENT DOCUMENTS

| | | | | |
|---|---|---|---|---|
| EP | 1 202 550 A2 | * | 2/2002 | |
| JP | 275081 A | * | 10/1997 | ......... H01L/21/268 |
| JP | 214324 A | * | 8/1999 | ......... H01L/21/268 |
| JP | 202673 A | * | 7/2000 | ......... B23K/26/06 |

* cited by examiner

Primary Examiner—Diego Gutierrez
Assistant Examiner—Amanda J Hoolahan
(74) Attorney, Agent, or Firm—Nields & Lemack

(57) ABSTRACT

A laser beam irradiation device, comprising a light source for emitting a laser beam, a cylindrical lens, an optical system for entering the laser beam to the cylindrical lens perpendicularly with respect to a center line of the cylindrical lens, and a luminous flux rotating means for rotating the incident laser beam around an optical axis of the laser beam.

8 Claims, 3 Drawing Sheets

SPREADING ANGLE OF FAN-SHAPED LASER BEAM ACCORDING TO DIAMETER OF CYLINDRICAL LENS AND DIAMETER OF INCIDENT LIGHT

LASER BEAM IRRADIATION DEVICE

BACKGROUND OF THE INVENTION

The present invention relates to a laser beam irradiation device for irradiating a fan-shaped laser beam, and in particular, to a laser beam irradiation device by which it is possible to change a spreading angle of the fan-shaped laser beam irradiated from the device.

In the past, a method for projecting a fan-shaped laser beam has been known. According to this method, a diverging light beam emitted from a laser light source passes through a cylindrical lens, and a luminous flux of a laser beam is turned to a fan-like shape by refractive power caused by a curved surface of the cylindrical lens.

In general, there are such requirements on the fan-shaped laser beam that the luminous flux has spreading but must be as thin as possible. However, in the fan-shaped laser beam provided by a conventional type laser beam irradiation device, the diverging light passes through the cylindrical lens. When the light beam is projected for a long distance, the light beam is diffused in a thickness direction, i.e. in the direction of its thickness, and becomes thicker. Accordingly, the fan-shaped laser beam projected by the conventional type laser beam irradiation device is very useful for the application at a near distance. However, for the application at a long distance, the fan-shaped laser beam is spread widely and luminance is decreased. Also, the thickness of the fan-shaped laser beam is increased, and inconveniences arise practically when it is used for forming a reference line. Further, the spreading angle is fixed in the conventional case. For instance, when a larger spreading angle is required for the application at a near distance or when there is a request to reduce the spreading angle for the application at a long distance, the conventional type device cannot meet the requirements.

SUMMARY OF THE INVENTION

It is an object of the present invention to provide a laser beam irradiation device, by which it is possible to change a spreading angle of a laser beam and to keep a thickness of a fan-shaped laser beam in a thin condition even for the application at a long distance.

To attain the above object, the laser beam irradiation device according to the present invention comprises a light source for emitting a laser beam, a cylindrical lens, an optical system for entering the laser beam to the cylindrical lens perpendicularly with respect to a center line of the cylindrical lens, and a luminous flux rotating means for rotating the incident laser beam around an optical axis of the laser beam. Also, the present invention provides the laser beam irradiation device as described above, wherein the optical system comprises a condenser lens for entering a parallel flux to the cylindrical lens. Further, the present invention provides the laser beam irradiation device as described above, wherein the optical system enters the laser beam to the cylindrical lens perpendicularly with respect to the center line after the laser beam passes through the cylindrical lens in parallel to the center line of the cylindrical lens, and wherein the optical system comprises a corner cube prism and a pentagonal prism. Also, the present invention provides the laser beam irradiation device as described above, wherein the optical system comprises a rhombic prism for moving the optical axis in a parallel direction, and a pentagonal prism for entering the laser beam projected from the rhombic prism to the cylindrical lens perpendicu- larly with respect to the center line. Further, the present invention provides the laser beam irradiation device as described above, wherein the luminous flux rotating means is designed in such manner that the prism holder for holding the optical system is rotated around the center line of the cylindrical lens.

BRIEF DESCRIPTION OF THE DRAWINGS

FIG. 1 is a basic block diagram of an embodiment of the present invention.

FIG. 2 is a basic block diagram of the embodiment of the present invention.

DETAILED DESCRIPTION OF THE INVENTION

Figure 1A:
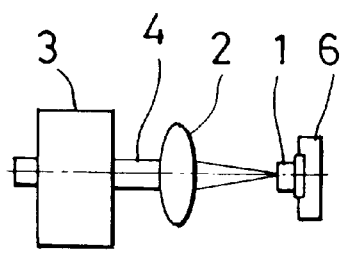
FIG. 1(A) is a side view.

Description will be given below on an embodiment of the present invention referring to the drawings.

FIG. 1 and FIG. 2 each represents a basic block diagram of a device according to the present invention.

Figure 1B:
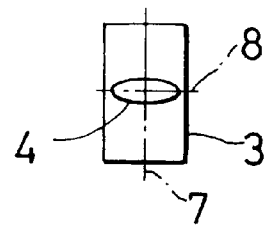
FIG. 1(B) is a front view.
Figure 1C:
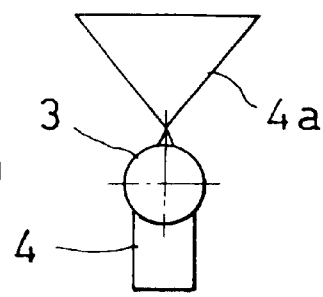
FIG. 1(C) is a plane view.
Figure 2A:
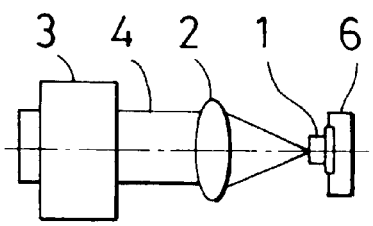
FIG. 2(A) is a side view.
Figure 2B:
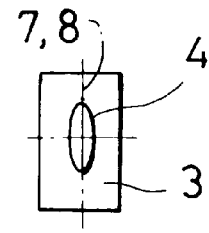
FIG. 2(B) is a front view.
Figure 2C:
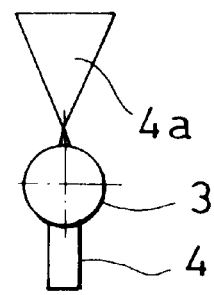
FIG. 2(C) is a plane view.

In each of FIG. 1 and FIG. 2, FIGS. 1(A) and FIG. 2(A) each represents a side view, FIGS. 1(B) and FIG. 2(B) each represents a front view, and FIGS. 1(C) and FIG. 2(C) each represents a plane view.

In the figures, reference numeral 1 denotes a laser light source, e.g. a semiconductor laser, 2 is a condenser lens which turns the laser beam from the laser light source 1 to a laser beam which has a parallel flux, 3 is a cylindrical lens, 4 is a laser beam irradiated from the laser light source 1, and 6 is a luminous flux rotating means, which can rotate the luminous flux of the laser beam emitted from the laser light source 1 at an angle of 90° around an optical axis of the luminous flux.

A cross-section of the luminous flux of the laser beam 4 emitted from the semiconductor laser is in an elliptical shape. For this reason, a cross-section of the luminous flux of the laser beam 4 which has been turned to the parallel flux by the condenser lens 2 is also in an elliptical shape.

In FIG. 1, the laser beam 4 is entered to the cylindrical lens 3 so that a longer axis 8 of the cross-section of the luminous flux crosses perpendicularly to a center line 7 of the cylindrical lens 3. In FIG. 2, the luminous flux of the laser beam 4 is rotated by the luminous flux rotating means 6 at an angle of 90° around the optical axis of the luminous flux and the laser beam is entered so that a longer axis 8 of the cross-section of the luminous flux runs in parallel to or is aligned with the center line 7 of the cylindrical lens 3. The laser beam 4, which has passed through the cylindrical lens 3, is projected as a fan-shaped laser beam 4a.

As shown in FIG. 1, when the longer axis 8 of the cross-section of the luminous flux crosses perpendicularly the center line 7, the spreading angle of the fan-shaped laser beam 4a is widened. When the longer axis 8 of the cross-section of the luminous flux is aligned with the center line 7, the spreading angle of the fan-shaped laser beam 4a is small.

Figure 3:
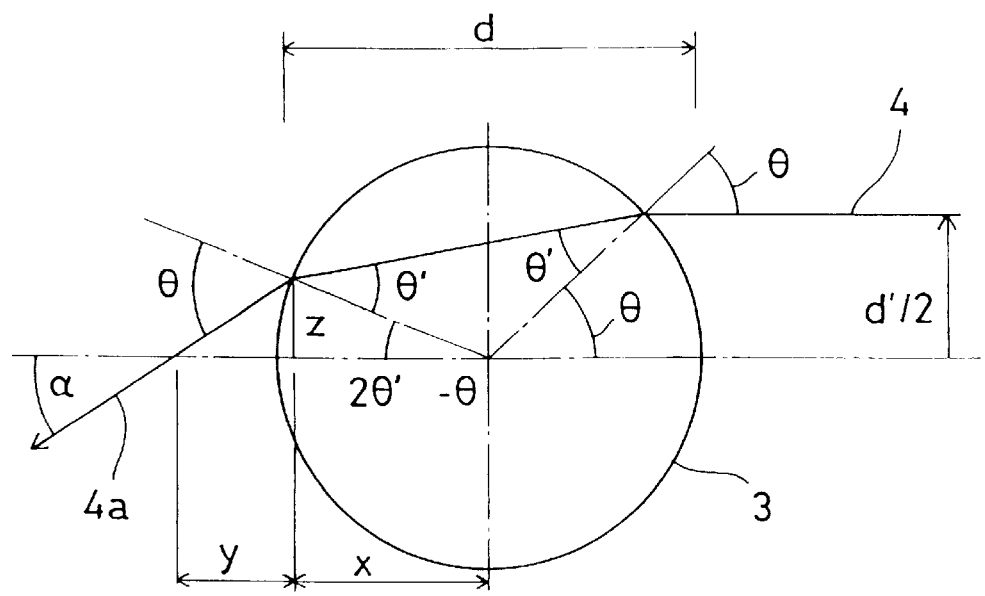
FIG. 3 is a drawing to explain a cylindrical lens and a condition of refraction of a luminous flux.
Figure 4:
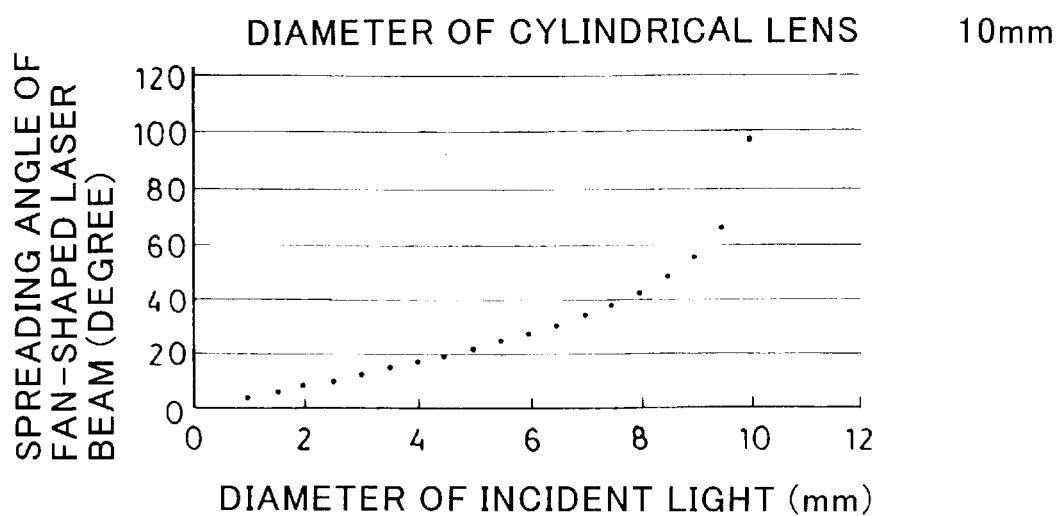
FIG. 4 is a diagram showing a diameter of the luminous flux in the cylindrical lens and a spreading angle of a fan-shaped laser beam.

Referring to FIG. 3 and FIG. 4, description will be given on a width of the luminous flux of the laser beam 4 entering the cylindrical lens 3 and the spreading angle of the fan-shaped laser beam 4a after it has passed through the cylindrical lens 3.

FIG. 3 is a drawing to show relationship between the luminous flux of the laser beam 4 entering the cylindrical lens 3 and the spreading angle of the luminous flux of the fan-shaped laser beam 4a after it has passed through the cylindrical lens 3.

It is supposed now that a diameter of the cylindrical lens 3 is d, a radius of the incident luminous flux of the laser beam 4 is d'/2, a refractive index of the cylindrical lens 3 is n, and the spreading angle (half-value) of the luminous flux of the fan-shaped laser beam 4a after it has passed through the cylindrical lens 3 is α.

An incident angle θ of the laser beam 4 to the cylindrical lens 3 is given by the following equation (1):

$$\theta = \sin^{-1}(d'/d) \quad (1)$$

A refractive angle θ' of the optical axis of the light entering the cylindrical lens 3 after it has entered the cylindrical lens 3 can be given by the following equation (2).

$$\theta' = \sin^{-1}(1/n \cdot \sin \theta) \quad (2)$$

The spreading angle α (half-value) of the fan-shaped laser beam 4a after it has passed through the cylindrical lens 3 can be given by the following equation (3).

$$\alpha = 2\theta - 2\theta' \quad (3)$$

If relationship between a position of the incident light optical axis of the laser beam 4 with respect to a radial direction of the cylindrical lens 3 and the spreading angle α of the fan-shaped laser beam 4a is graphically represented in a diagram based on the equation (3), it is as shown in FIG. 4. From this graph, it is evident that the longer the distance from the center of the cylindrical lens 3 is, the more the light is refracted.

Therefore, the larger the width of the luminous flux entering the cylindrical lens 3 is, the more the spreading angle of the fan-shaped laser beam is increased.

Description will be given below on a first variation of the laser beam irradiation device referring to FIG. 5.

A light source unit holder 13 in a cylindrical shape is rotatably mounted on a base 11 via rotation bearings 12. Inside the light source unit holder 13, the laser light source 1 using a semiconductor laser as a light source is provided. The condenser lens 2 is arranged on the optical axis of the laser light source 1, and the cylindrical lens 3 is disposed so that its center line is aligned with the optical axis. The condenser lens 2 turns the laser beam 4 from the laser light source 1 to a laser beam which has a parallel flux. End surfaces of the cylindrical lens 3 are positioned perpendicularly to the optical axis, and the laser beam 4 advances straightly through the cylindrical lens 3.

On an upper end of the light source unit holder 13, a corner prism holder 15 is rotatably mounted via a hollow shaft 14, and a corner cube prism 16 is held on the corner prism holder 15. On a lower surface of the corner prism holder 15, a pentagonal prism holder 17 is fixed, and a pentagonal prism 18 is held by the pentagonal prism holder 17. An optical path hole 19 is formed in the corner prism holder 15 and the pentagonal prism holder 17, and the laser beam 4 entering and reflected by the corner cube prism 16 and the pentagonal prism 18 passes through the optical path hole 19.

The laser beam 4 from the laser light source 1 is turned to a laser beam which has a parallel flux by the condenser lens 2. The laser beam 4 is reflected by the corner cube prism 16 so that the laser beam 4 run in parallel to the incident light. Further, the beam is deflected in a perpendicular direction (horizontal direction) by the pentagonal prism 18. Therefore, the laser beam 4 from the laser light source 1 enters the cylindrical lens 3 in a direction perpendicular to the center line 7.

The light source unit holder 13 holds the cylindrical lens 3 with a gap 21, and it allows the reflected laser beam from the pentagonal prism 18 to pass so that the laser beam crosses perpendicularly the center line of the cylindrical lens 3.

In the following, description will be given on operation.

The laser beam 4 emitted from the laser light source 1 passes through the cylindrical lens 3 without changing the optical axis. Then, the laser beam enters the corner cube prism 16 and is reflected.

The corner cube prism 16 reflects the laser beam 4 in such manner that the exit light optical axis is to be in parallel to the incident light optical axis. The laser beam 4 reflected by the corner cube prism 16 passes through the optical path hole 19 and enters the pentagonal prism 18.

The pentagonal prism 18 reflects the laser beam 4 by maintaining a right-angle direction with respect to the incident light optical axis regardless of incident angle of the incident light optical axis. More strictly, when the pentagonal prism 18 is tilted in a perpendicular direction with respect to the paper surface in FIG. 5, perpendicular crossing of the reflection light optical axis will be lost, while this is negligible value when the tilt angle of the pentagonal prism 18 is very small.

Further, the corner prism holder 15, which holds the corner cube prism 16 and the pentagonal prism 18, is rotatable via the shaft 14. However, when it is rotated, deflection of the shaft 14 unavoidably occurs. As a result, the laser beam 4 always enters the pentagonal prism 18 at a deflected angle.

However, because of the properties of the corner cube prism 16 and the pentagonal prism 18, and further when the corner cube prism 16 and the pentagonal prism 18 are arranged as described above, the laser beam 4 passing through the cylindrical lens 3 in the direction of the optical axis can be directed perpendicularly to the center line 7 of the cylindrical lens 3 without being influenced by the deflection of the shaft 14. This makes it possible to prevent the tilting of the fan-shaped laser beam 4a.

In the arrangement as described above, when the corner prism holder 15 is rotated, the luminous flux of the laser beam 4 entering from a direction perpendicular to the cylindrical lens 3 is rotated around the optical axis.

Figure 5:
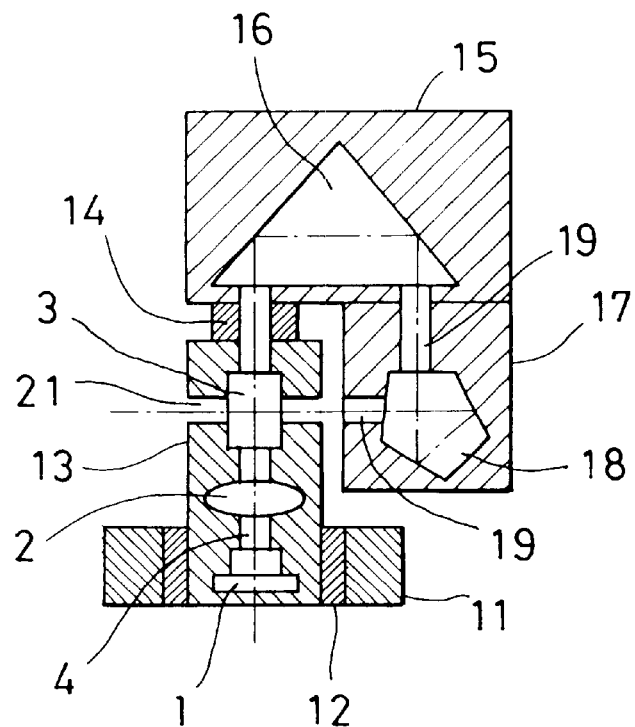
FIG. 5 is a cross-sectional view of an essential part of a first variation of the present invention.

It is supposed now that the condition of the luminous flux of the laser beam 4 with respect to the cylindrical lens 3 under the status shown in FIG. 5 is the condition shown in FIG. 1, for instance. In this case, the fan-shaped laser beam 4a has a wider spreading angle and this is suitable for an application to form a reference line, etc. at a near distance. Because the laser beam 4 has a parallel flux, the beam is not spread in the thickness direction.

Next, the corner prism holder 15 is continuously rotated up to an angle of 90° around the shaft 14. The condition of the luminous flux of the laser beam 4 entering the cylindrical lens 3 is such that the longer axis 8 of the cross-section of the luminous flux is aligned with the center line 7 of the cylindrical lens 3 as shown in FIG. 2. Therefore, the spreading angle of the projected fan-shaped laser beam 4a is decreased. That is, by rotating the corner prism holder 15, it is possible to change the spreading angle of the fan-shaped laser beam 4a.

By rotating the light source unit holder 13, it is also possible to change the irradiating direction. In this case, the corner prism holder 15 is also rotated together.

As described above, the laser beam 4 is a parallel flux and it is not spread in the thickness direction, i.e. in the direction of its thickness, and the thickness is equalized with the length of the longer axis of the luminous flux cross-section. Immediately after being emitted from the laser light source 1, the luminous flux is not large, but the value of largeness is enough for practical use.

In the condition shown in FIG. 1, the spreading angle of the fan-shaped laser beam 4a is at the largest. In the condition shown in FIG. 2, the spreading angle of the fan-shaped laser beam 4a is at the smallest. By rotating the corner prism holder 15, it is possible to change the fan-shaped laser beam 4a to any desired angle between the largest spreading angle and the smallest spreading angle. In this case, the thickness of the luminous flux of the fan-shaped laser beam 4a is between the length of the longer axis and the length of the shorter axis of the cross-section of the luminous flux of the laser beam 4.

A spreading angle adjusting motor (not shown) may be provided on the base 11 or on the light source unit holder 13. If the corner prism holder 15 is rotated via a train of gears, it is possible to set an accurate angle. Further, if it is designed to be driven via a control unit provided with a spreading angle adjusting motor communication function, the spreading angle can be adjusted by remote control.

Figure 6:
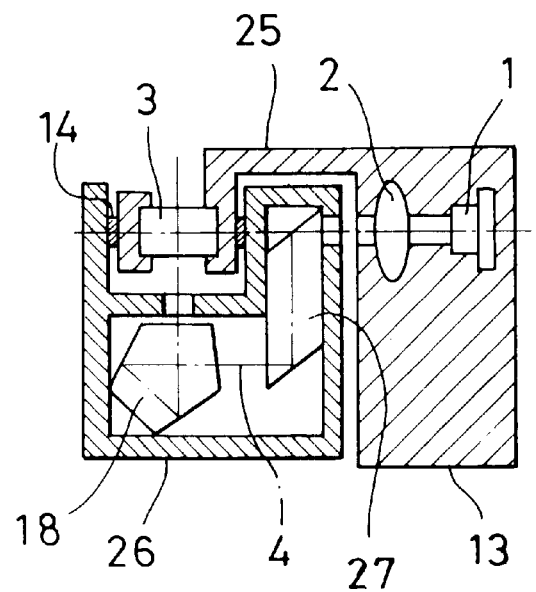
FIG. 6 is a cross-sectional view of an essential part of a second variation of the present invention.

Referring to FIG. 6, description will be given on a second variation.

The laser light source 1 having an optical axis in a horizontal direction is provided on the light source unit holder 13, and the condenser lens 2 is arranged on the optical axis.

An arm 25 with a hook shape is extended in a horizontal direction from the light source unit holder 13, and the cylindrical lens 3 is retained at a horizontal position on the arm 25. A prism holder 26 is rotatably arranged on the arm 25 via the shaft 14 so that it can be rotated at least at an angle of 90°. The center line of the shaft 14 is aligned with the center line 7 of the cylindrical lens 3.

The prism holder 26 holds a rhombic prism 27 and the pentagonal prism 18. The rhombic prism 27 reflects the laser beam 4 coming from the laser light source 1 on both end surfaces in parallel, and this prism moves the laser beam 4 while maintaining the exit light optical axis in parallel to the incident light optical axis of the laser beam 4, and the laser beam 4 is guided toward the pentagonal prism 18. The pentagonal prism 18 deflects the incident light optical axis in a perpendicular direction and the laser beam enters the cylindrical lens 3. From the cylindrical lens 3, the fan-shaped laser beam 4a spreading in a vertical direction is projected.

In this variation, by rotating the prism holder 26 at an angle of 90°, the condition of the luminous flux of the laser beam 4 entering the cylindrical lens 3 is changed from the condition of FIG. 1 to the condition of FIG. 2.

When the laser beam 4 enters the cylindrical lens 3 in a lateral direction with respect to the center line 7 of the cylindrical lens 3 (see FIG. 1), posture of the laser light source 1 is determined in such manner that the center of the optical axis of the fan-shaped laser beam 4a is projected in a vertical direction. Also, when the prism holder 26 is rotated at an angle of 90° and the laser beam enters in a longitudinal direction with respect to the center line 7 of the cylindrical lens 3 (see FIG. 2), the laser beam 4 is projected in a horizontal direction and the center of the optical axis of the fan-shaped laser beam 4a is projected in the horizontal direction. Then, it is possible to provide a laser beam irradiation device, which has practical luminance distribution, i.e. the laser beam has luminance not so high but larger spreading for a ceiling at a near distance, and it has high luminance but smaller spreading for an object at a long distance in a horizontal direction.

In the present variation, tilting of the pentagonal prism 18 occurs due to deflection of the shaft 14. However, if the accuracy of the shaft is increased, only the negligible error occurs in practical application.

In the variation shown in FIG. 5, the prism holder comprising the corner prism holder 15 and the pentagonal prism holder 17 is not uniformly arranged with respect to the shaft 14. For this reason, when the laser beam 4 is projected in a vertical direction, for instance, the shaft is very likely to be deflected if the device is tilted at an angle of 90°. On the other hand, in the present variation, the rhombic prism 27 is used instead of the corner prism 16, and the space required can be reduced. Thus, the balance of the rotating prism holder 26 can be more equalized with respect to the shaft 14. Further, the present variation is designed in such a structure that the laser beam 4 does not pass through the cylindrical lens 3, and no high accuracy is required on both end surfaces of the cylindrical lens 3.

According to the present invention, the laser beam irradiation device comprises a light source for emitting a laser beam, a cylindrical lens, an optical system for entering the laser beam to the cylindrical lens perpendicularly with respect to a center line of the cylindrical lens, and a luminous flux rotating means for rotating the incident laser beam around an optical axis of the laser beam. Because the spreading angle of the fan-shaped laser beam can be changed by the rotation of the laser beam, it is possible to project the fan-shaped laser beam with high luminance for the application in the range from a near distance to a long distance.

What is claimed is:

1. A laser beam irradiation device, comprising a light source for emitting a laser beam, a cylindrical lens, an optical system for causing the laser beam to enter said cylindrical lens perpendicularly with respect to a center line of said cylindrical lens, and a luminous flux rotating means for rotating a luminous flux of the laser beam which enters said cylindrical lens around an optical axis of the laser beam.

2. A laser beam irradiation device according to claim 1, wherein said optical system comprises a condenser lens for entering a parallel flux to said cylindrical lens.

3. A laser beam irradiation device according to claim 1, wherein said optical system enters the laser beam to said cylindrical lens perpendicularly with respect to said center line after the laser beam passes through said cylindrical lens in parallel to the center line of said cylindrical lens, and wherein said optical system comprises a corner cube prism and a pentagonal prism.

4. A laser beam irradiation device according to claim 1, wherein said optical system comprises a rhombic prism for moving the optical axis in a parallel direction, and a pentagonal prism for entering the laser beam projected from said rhombic prism to said cylindrical lens perpendicularly with respect to the center line.

5. A laser beam irradiation device according to claim 1, wherein the luminous flux rotating means is designed in such manner a that a prism holder for holding said optical system is rotated around the center line of said cylindrical lens.

6. A laser beam irradiation device according to claim 1, wherein a spread angle of an irradiated fan-shaped laser beam can be changed by rotating the luminous flux of the laser beam around the optical axis.

7. A laser beam irradiation device, comprising a light source for emitting a laser beam, a cylindrical lens being disposed in such manner that a center line of said cylindrical lens is aligned with an optical axis of said light source, a holder for said light source being provided rotatably around the center line of said cylindrical lens, an optical system which is provided on said holder and which causes said laser beam to enter said cylindrical lens perpendicularly with respect to the center line of said cylindrical lens, whereupon a fan-shaped laser beam is irradiated.

8. A laser beam irradiation device according to claim 7, wherein a spread angle of said fan-shaped laser beam can be changed by rotating said holder.

* * * * *